(12) United States Patent
Saheb

(10) Patent No.: US 12,166,524 B2
(45) Date of Patent: Dec. 10, 2024

(54) PROFILE-BASED DIRECT MEMORY ACCESS FOR TRANSCEIVER RECONFIGURATION

(71) Applicant: Analog Devices, Inc., Wilmington, MA (US)

(72) Inventor: Hakim Saheb, Reading, MA (US)

(73) Assignee: Analog Devices, Inc., Wilmington, MA (US)

( * ) Notice: Subject to any disclaimer, the term of this patent is extended or adjusted under 35 U.S.C. 154(b) by 137 days.

(21) Appl. No.: 18/022,735

(22) PCT Filed: Jul. 21, 2021

(86) PCT No.: PCT/US2021/042454
§ 371 (c)(1),
(2) Date: Feb. 22, 2023

(87) PCT Pub. No.: WO2022/020405
PCT Pub. Date: Jan. 27, 2022

(65) Prior Publication Data
US 2023/0308131 A1    Sep. 28, 2023

Related U.S. Application Data

(60) Provisional application No. 63/054,963, filed on Jul. 22, 2020.

(51) Int. Cl.
*G06F 12/00* (2006.01)
*H04B 1/7136* (2011.01)

(52) U.S. Cl.
CPC . *H04B 1/7136* (2013.01); *H04B 2001/71365* (2013.01); *H04B 2201/71353* (2013.01); *H04B 2201/71384* (2013.01)

(58) Field of Classification Search
CPC ........ H04B 1/7136; H04B 2001/71365; H04B 2001/71353; H04B 2001/713847
See application file for complete search history.

(56) References Cited

U.S. PATENT DOCUMENTS 4,792,768 A     12/1988  Fried et al.
2004/0013167 A1  1/2004  Jones
(Continued)

OTHER PUBLICATIONS

Y.H. Du et al., Fast Frequency Hopping Signal Generator based on DDS, 2010, Advanced Materials Research, ISSN: 1662-8985, vol. 142, pp. 162-165 (Year: 2010).*
(Continued)

*Primary Examiner* — Shawn X Gu
(74) *Attorney, Agent, or Firm* — Knobbe, Martens, Olson & Bear, LLP

(57) ABSTRACT

Multiple transmit and receive channels in a communication transceiver may be dynamically configured using corresponding channel registers. The present disclosure proposes a profile-based direct memory access (PDMA) that can be used to transfer data from a memory and program specific profile registers in a randomly accessed addressing manner. PDMAs can offload the system processor from reprogramming many system registers based on external or internal events in a multi channels communication system. Furthermore, a PDMA based DMA controller is proposed to configure the frequency hopping registers of the transceiver based on PDMA.

20 Claims, 12 Drawing Sheets

(56) References Cited

U.S. PATENT DOCUMENTS

2005/0169201 A1    8/2005  Huylebroeck
2014/0328431 A1*  11/2014  Haddad ............ H04L 25/03859
                                                                             375/296
2018/0295520 A1*  10/2018  Garg .................... H04W 16/10

OTHER PUBLICATIONS

International Search Report issued in International Application No. PCT/US2021/042454, dated Oct. 22, 2021.
Written Opinion issued in International Application No. PCT/US2021/042454, dated Oct. 22, 2021.
Du et al., "Fast Frequency Hopping Signal Generator based on DDS", Advanced Materials Research, vol. 142, Oct. 19, 2010, pp. 162-165.
Extended European Search Report issued in European Patent Application No. 21845933.7, dated Jul. 19, 2024.

* cited by examiner

PROFILE-BASED DIRECT MEMORY ACCESS FOR TRANSCEIVER RECONFIGURATION

RELATED APPLICATION

This application claims the benefit of and priority to U.S. Provisional Patent Application No. 63/054,963 entitled "PROFILE-BASED DMA FOR SYSTEM REGISTER CONFIGURATION" and filed Jul. 22, 2020, which is incorporated herein by reference in its entirety.

TECHNICAL FIELD OF THE DISCLOSURE

The present disclosure relates generally to transceivers implementing frequency hopping. In particular, the present disclosure enables hopping frequencies of transceivers to be configured or reconfigured.

BACKGROUND

A wide variety of signals and related protocols exist for the use of radio frequency (RF) signals in communication systems. Spread spectrum solutions utilize signals that are spread across a relatively wide spectral range of frequencies and, therefore, often have reduced interference and higher degrees of security than narrow band solutions.

One common approach to spread spectrum is frequency hopping. In a frequency hopping solution, the transmit/receive signals are moved around or hopped to different frequencies within a wide spectral range of frequencies. Applications such as communications, radar and electronic warfare use frequency hopping in order to avoid interference or detection, or to detect cloaked signals. The faster these systems can change frequencies—or frequency hop—the more agile they become, making it easier to avoid interference and detection.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
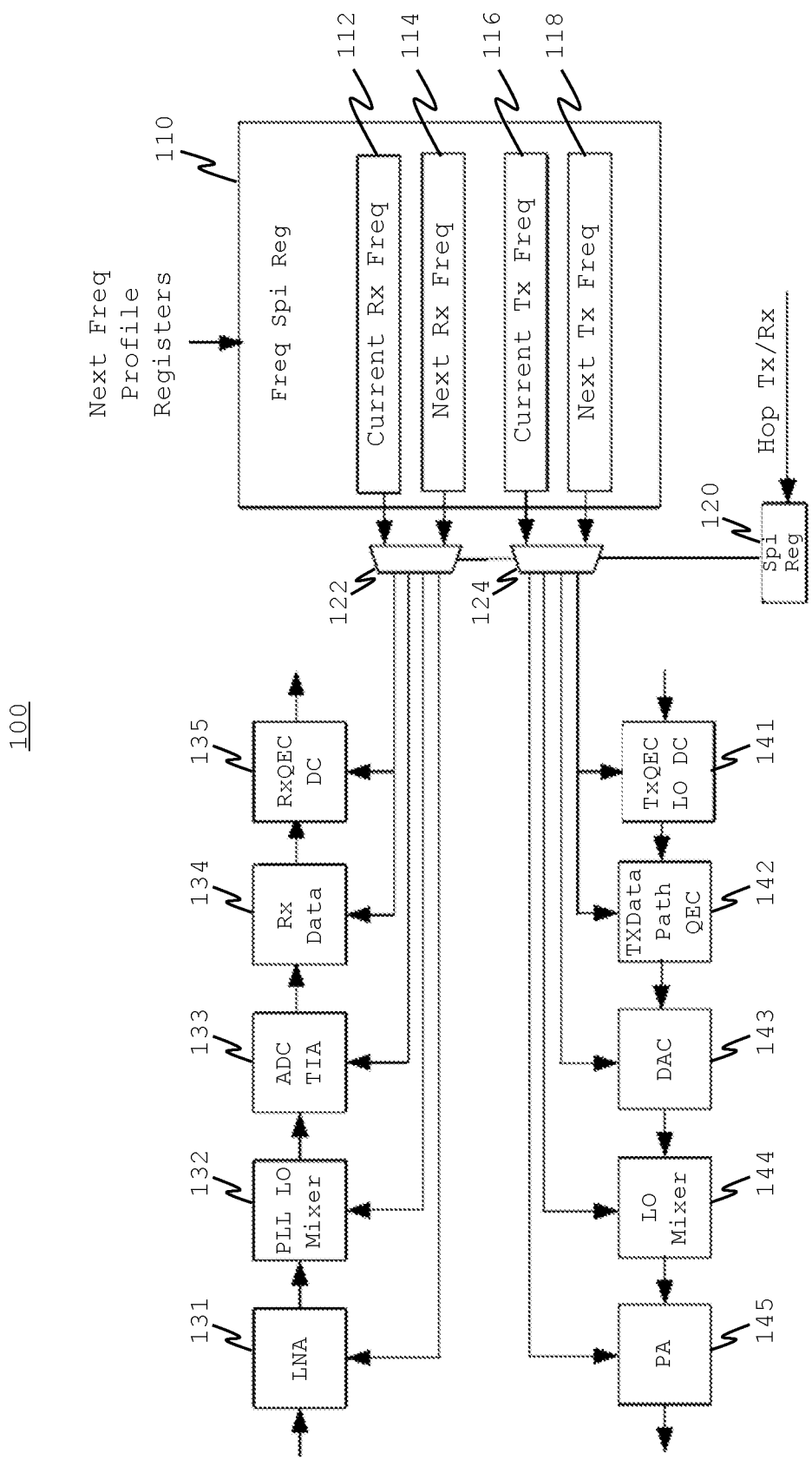
FIG. 1 is an illustrative block diagram of a part of a RF unit of a transceiver, according to some embodiments of the present disclosure.

The systems, methods and devices of this disclosure each have several innovative aspects, no single one of which is solely responsible for all of the desirable attributes disclosed herein. Details of one or more implementations of the subject matter described herein are set forth below and the accompanying drawings.

The present disclosure relates in general to transceivers including (re)configurable frequency hopping registers. Such receivers are used, e.g., in orthogonal frequency division multiplexing (OFDM) based communication systems. The transceiver may be an ultra-wideband (UWB) based transceiver.

A transceiver represents a fundamental part of a communication system. A digital transceiver typically includes, among others, a baseband (BB) processor, a RF unit, and a control unit for controlling the RF unit under control of the BB processor. The BB processor may manage a baseband data stream and may control function of the RF unit. The RF unit may use a configuration and control apparatus for its function. In some implementations the BB processor, the control unit and/or the RF unit of a digital transceiver may be integrated in a single chip. In some implementations the BB processor, the control unit and the RF unit may be implemented on separate chips.

Multiple transmit and receive channels in a communication transceiver may be dynamically configured using corresponding channel registers. In order to support fast frequency hopping, arbitrary sample rate change or profile switching, the present disclosure proposes a PDMA that can be used to transfer data from a memory and program specific profile registers in a randomly accessed addressing manner. The PDMAs can offload the system processor from reprogramming many system registers based on external or internal events in a multi channels communication system.

Furthermore, a PDMA based DMA controller (PDMA controller) is proposed to configure the fast frequency hopping registers of the transceiver based on PDMA. Advantageously, memory addresses from which the PDMA controller reads data may be modifiable, e.g., by a central processing unit (CPU).

PDMA as proposed by the present disclosure can also be used to save and restore data during a monitor operation mode, wherein the system enters deep sleep and wakes up periodically. A PDMA register save operation may be performed before entering sleep state, and a register restore operation may be performed right after wake up.

As will be appreciated by one skilled in the art, aspects of the present disclosure may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon.

The following detailed description presents various descriptions of specific certain embodiments. However, the innovations described herein can be embodied in a multitude of different ways, for example, as defined and covered by the claims and/or select examples. In the following description, reference is made to the drawings, where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the present disclosure, if used, the terms "substantially," "approximately," "about," etc., may be used to generally refer to being within +/−20% of a target value, e.g., within +/−10% of a target value, based on the context of a particular value as described herein or as known in the art. For the purposes of the present disclosure, the phrase "A and/or B" or notation "A/B" means (A), (B), or (A and B). For the purposes of the present disclosure, the phrase "A, B, and/or C" or notation "A/B/C" mean (A), (B), (C), (A and B), (A and C), (B and C), or (A, B, and C).

Other features and advantages of the disclosure will be apparent from the following description and the claims.

Example Fast Frequency Hopping RF Unit

A frequency hopping RF unit typically includes a transmitter (Tx) part and a receiver (Rx) part, each of which may be configured to operate at a specific transmission frequency. In order to support fast switching between frequencies, a next operating frequency may be stored in a hopping frequency memory, e.g., a memory register, close to the Tx and Rx path. This allows the next operating frequency to be configure in the Tx or Rx part, when a current frequency is to be hopped to the next frequency.

An example of an RF unit 100 of a transceiver device according to some embodiments of the present disclosure is shown in FIG. 1. In the example of FIG. 1, the Rx part of the RF unit 100 may include a low-noise amplifier (LNA) 131, a local oscillator (LO) mixer 132, an analog-to-digital converter transimpedance amplifier (ADC TIA) 133, an Rx data unit 134 and a direct current Rx quadrature error correction (RxQEC DC) module 135. The Tx part of the RF unit 100 may include a direct current Tx quadrature error and local oscillator correction (TxQEC LO DC) module 141, a Tx data path quadrature error correction (TxData Path QEC) 142, a digital-to-analog converter (DAC) 143, an LO mixer 144 and/or a power amplifier (PA) 145. The LO mixer may be implemented as a phase-locked loop (PLL) LO mixer.

The components 131-135 of the Rx path may be configured to operate at a current Rx frequency. The current Rx frequency 112 (depicted Current Rx Freq in FIG. 1) may be stored in the hopping frequency memory, e.g., a Serial Peripheral Interface (Spi) register or any other internal configuration register, depicted Freq Spi Reg 110. The RF unit 100 may be configured to hop to a next operating frequency 114 (depicted Next Rx Freq), which may be stored in the Freq Spi Reg 110. A hopping frequency selector 122 may select the frequency to be used by the Rx path from a current Rx frequency 112 and a next operating frequency 114 in the Freq Spi Reg 110. The hopping frequency selector 122 may be controlled by a Spi Reg selector 120. When the next Rx frequency is selected by the hopping frequency selector 122, its register may become the current Rx frequency register and a next Rx frequency may be loaded into the register of the current Rx frequency 112 to become the next Rx frequency.

Similarly, the components 141-145 of the Tx path may be configured to operate at a current Tx frequency. The current Tx frequency 116 (depicted Current Tx Freq in FIG. 1) may be stored in a hopping frequency memory, e.g., the Freq Spi Reg 110. The RF unit 100 may be configured to hop to a next operating frequency 118 (depicted Next Tx Freq), which may be stored in the Freq Spi Reg 110. A hopping frequency selector 124 may select the frequency to be used by the Tx path from a current Tx frequency 116 and a next operating frequency 118 of the Freq Spi Reg 110. The hopping frequency selector 124 may be controlled by the Spi Reg selector 120. When the next Tx frequency is selected by the hopping frequency selector 124, its register may become the current Tx frequency register and a next Tx frequency may be loaded into the register for the current Tx frequency 116 to become the next Tx frequency.

In FIG. 1, loading of the next frequency into the register may be controlled by the input to the Freq Spi Reg 110 depicted 'Next Freq Profile Registers'. An RF unit 100 typically includes one frequency register for 114, 118 for the next operating frequency, to allow fast switching between the current operating frequency and the next operating frequency with minimal switching processing overhead, e.g., in the hopping frequency selector 122, 124. Such RF unit 100 may be used in a fast frequency hopping or ultra-fast frequency hopping transceiver. An RF unit 100 may include multiple next frequency registers for each of the Rx and/or Tx path from which the hopping frequency selector 122, 124 may select operating frequencies. The frequency registers for 112, 114 of the Rx path and the frequency registers for 116, 118 of the Tx path may be implemented as a circular buffer for storing and reading the current and next operating frequencies.

FIG. 1 shows a RF unit 100 including one Tx path and one Rx path. The RF unit 100 may one or more Tx and Rx paths, i.e., multiple Tx and/or Rx paths are possible. The RF unit 100 may include only one or more Tx paths or only one or more Rx paths.

Example Transceiver

Figure 2:
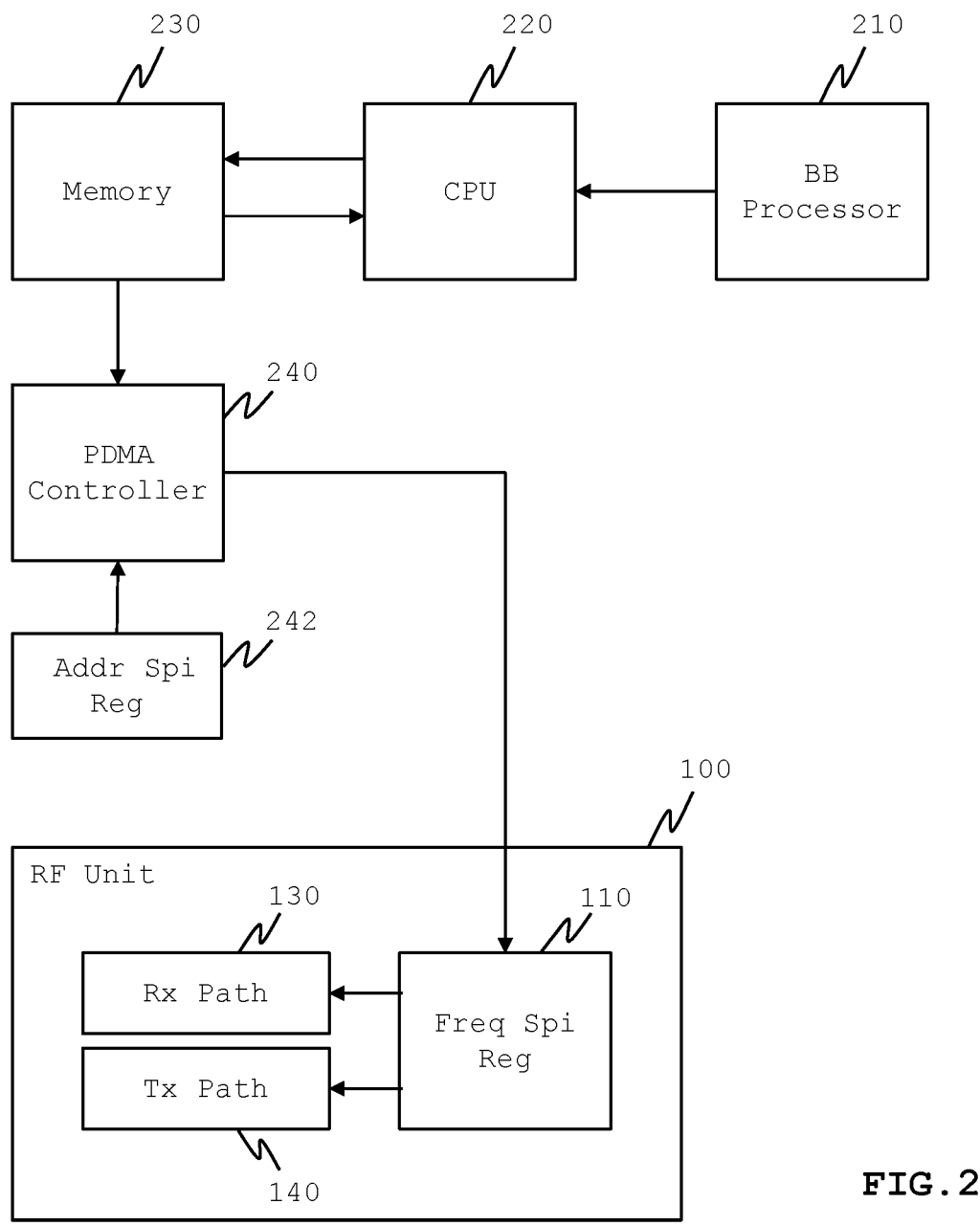
FIG. 2 is an illustrative block diagram of a transceiver, according to some embodiments of the present disclosure.

FIG. 2 shows an example of a transceiver 200, according to some embodiments of the present disclosure. The transceiver 200 may include a frequency hopping RF unit, such as RF unit 100 of FIG. 1. The RF unit 100 may include memory registers for storing a current operating frequency and a next operating frequency, such at Freq Spi Reg 110 shown in FIG. 1. The RF unit 100 may be configured to operate an Rx path 130 (e.g., including the Rx part 131-135 of FIG. 1) at the Rx hopping frequencies stored in the Freq Spi Reg 110 and to operate a Tx path 140 (e.g., including the Tx part 141-145 of FIG. 1) at the Tx hopping frequencies stored in the Freq Spi Reg 110.

The hopping frequencies to be stored in the Freq Spi Reg 110 may be predefined by a BB processor 210 and stored in a memory 230 under control of a CPU 220. An example of a CPU 220 is an ARM™ based CPU. The memory 230 may be any read/write memory accessible by the CPU 220, typically some form of random-access memory (RAM). A PDMA controller 240 may be configured to read operating frequencies from the memory 230 and store these frequencies in the Freq Spi Reg 110, without involvement of the CPU 220.

Figure 3:
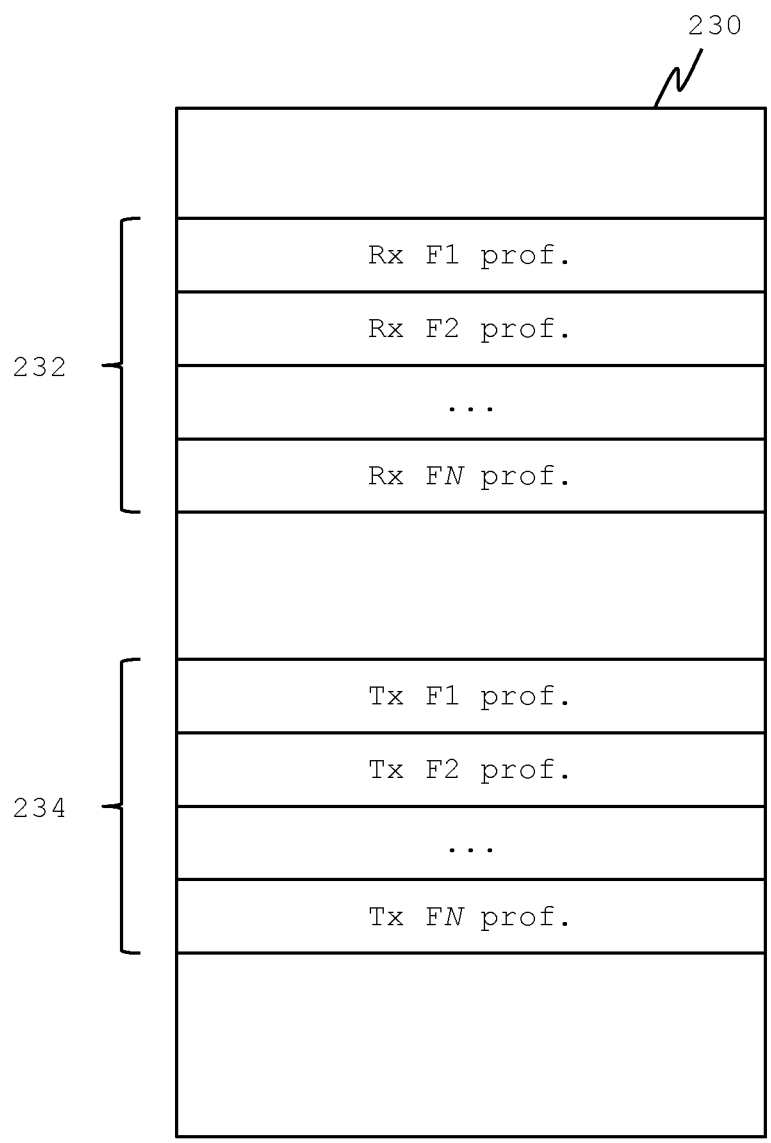
FIG. 3 illustrates a memory content of a transceiver, according to some embodiments of the present disclosure.

As shown in FIG. 3, the memory 230 may store one or more frequency profiles 232, 234 for each of the Rx path 130 and Tx path 140 of the RF unit 100. One frequency profile may include a data representation of a sequence of frequencies to be used during frequency hopping. In the example of FIG. 3, the memory 230 stores N profiles for each of the Rx and Tx paths, i.e., receiver frequency profiles 1 to N (depicted 'Rx F1 prof.' . . . 'Rx FN prof.') 232 and transmitter frequency profiles 1 to N (depicted 'Tx F1 prof.'-'Tx FN prof.') 234.

The PDMA controller 240 may be configured to read the sequence of frequencies from one of the Rx respectively Tx frequency profiles in the memory 230 and transmit the obtained frequencies to the Freq Spi Reg 110 when a next hopping frequency is to be stored in the Freq Spi Reg 110, e.g., in the register for the next operating frequency 114 or the next operating frequency 118, as explained in FIG. 1.

The frequency profiles may be stored at a configurable memory location, i.e., memory address, in the memory 230. The address of a frequency profile to be read, may be stored in a memory register for the PDMA controller 240, e.g., in an address Spi register 242 (depicted 'Addr Spi Reg' in FIG. 2) or any other internal configuration register. The memory address may be stored in the address Spi register 242 as an absolute address pointing to the exact memory location in the memory 230. Alternatively, the memory address may be stored in the address Spi register 242 as a relative address pointing to an offset from a predefined memory location in the memory 230.

The PDMA controller 240 may operate in various modes, wherein the modes differ in the way hopping frequencies are stored in the memory 230 and used by the PDMA controller 240. Examples of the various modes are a block transfer mode, a one-time event-based transfer mode and a continuous event-based transfer mode.

Example PDMA Controller Operating in a Block Transfer Mode

Figure 4:
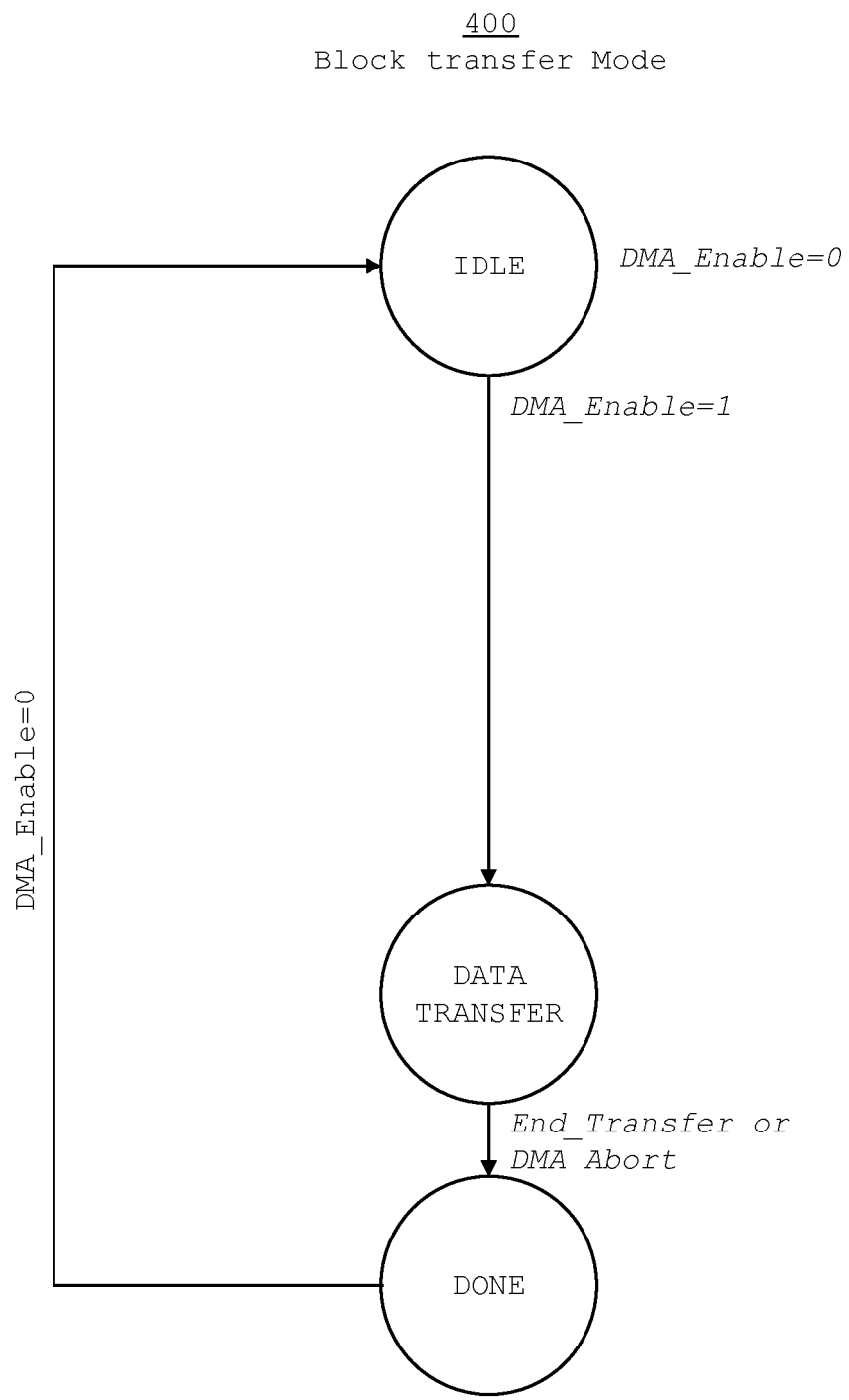
FIG. 4 shows a state diagram of a profile-based direct memory access (PDMA) controller in a block transfer mode, according to some embodiments of the present disclosure.

In a block transfer mode, the PDMA controller 240 may operate as shown in the state machine diagram of FIG. 4. In an IDLE state, a DMA_Enable control line may be set to a logical 0. Setting DMA_Enable to a logical 1 may trigger the PDMA controller 240 to start a data transfer from the memory 230 to the Freq Spi Reg 110. When the data transfer has finished ('End_transfer') or the DMA transfer aborts for whatever reason (DMA Abort), DMA_Enable may be set to logical 0 placing the PDMA controller 240 in IDLE mode again.

Figure 5:
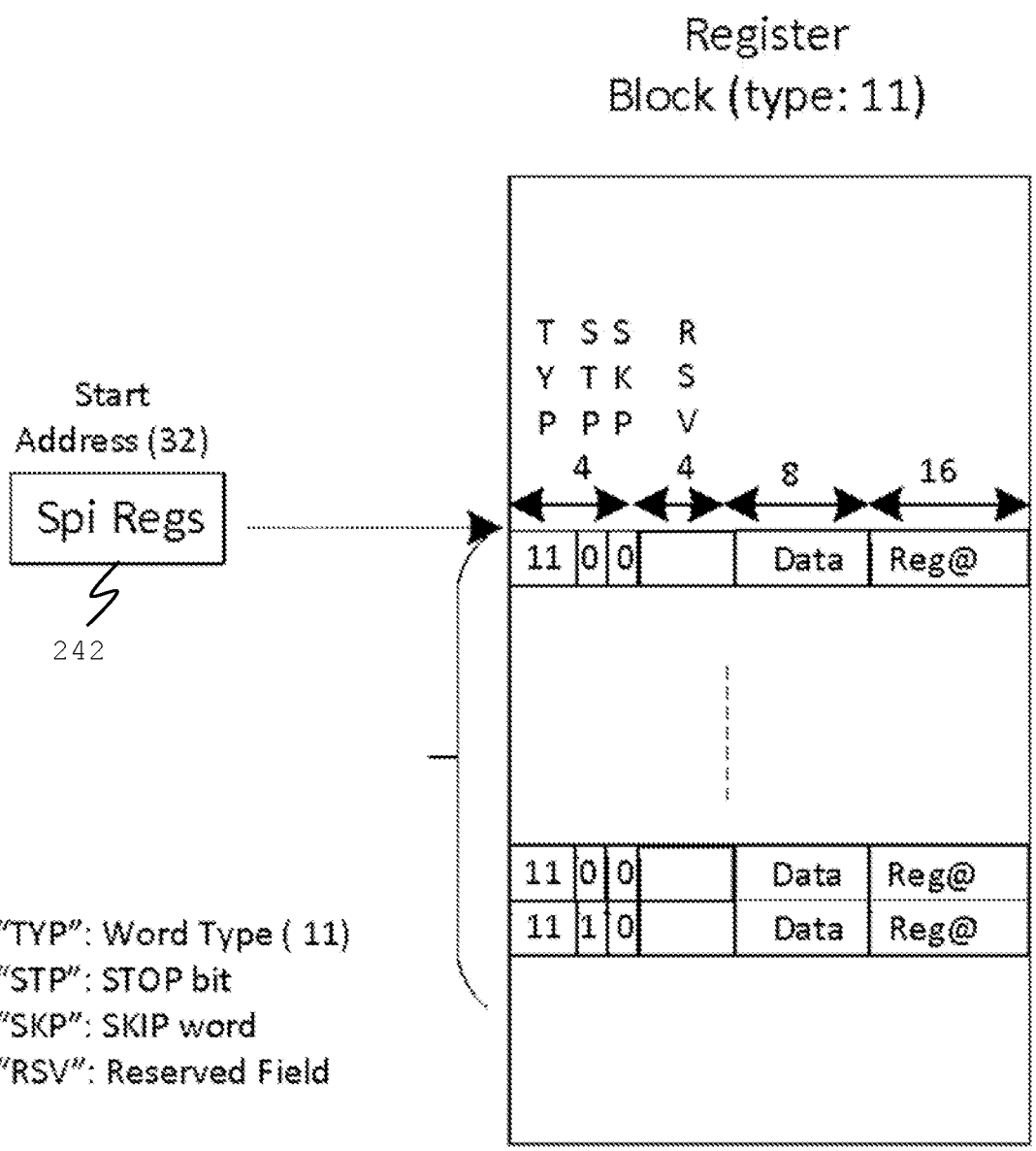
FIG. 5 shows an accessing of a frequency profile in a memory by a PDMA controller, according to some embodiments of the present disclosure.

FIG. 5 shows an example of a frequency profile, e.g., the Rx F1 prof profile of FIG. 3, read by the PDMA controller 240 in the block transfer mode. An Spi register, e.g., address Spi register 242 of FIG. 2, may store a memory address, e.g., a 32-bit start address pointing to the memory location of a register block in the memory 230. The register block may include the frequency profile. When DMA_Enable is set, the PDMA controller 240 may start reading frequency data from the frequency profile and store the frequency data in the RF unit 100, e.g., in the Freq Spi Reg 110.

In the example of FIG. 5, the frequency profile includes a number of entries, each including an 8-bit data field (Data) and a 16-bit register address field (Reg@). The data field may include an operating frequency to be stored in the Freq Spi Reg 110, e.g., in one of the frequency registers for 112, 114, 116, 118 shown in FIG. 1. The Reg@ field may be used to store a memory address of the Freq Spi Reg 110 or one of the frequency registers for 112, 114, 116, 118 of the Freq Spi Reg 110. The PDMA controller 240 may use the Reg@ information to store the 8-bit data at the memory register location identified by the Reg@ information.

As shown in FIG. 5, an entry in the frequency profile may include further information, such as type information (TYP), stop bit information (STP), skip word information (SKP) and/or a reserved field for future or other use (RSV). A TYP field may be used to indicate a type of information of the entry, in this example using 2 bits '11' to indicate that the entry includes frequency data (Data). An STP bit may be used to indicate that there are more entries in the frequency profile (in this example having a value of '1') or that the entry is the last in the frequency profile (in this example having a value of '0'). A 1-bit SKP bit may be used to indicate that the current entry is to be skipped. In the example of FIG. 5, each entry has a length of 32 bits, but any other length may be used as needed.

The entries of the frequency profile of FIG. 5, i.e., of the entries in the register block, may be written to the memory 230 by the CPU 220, possibly under control of the BB processor 210.

Example PDMA Controller Operating in a One-Time Event-Based Transfer Mode

Figure 6:
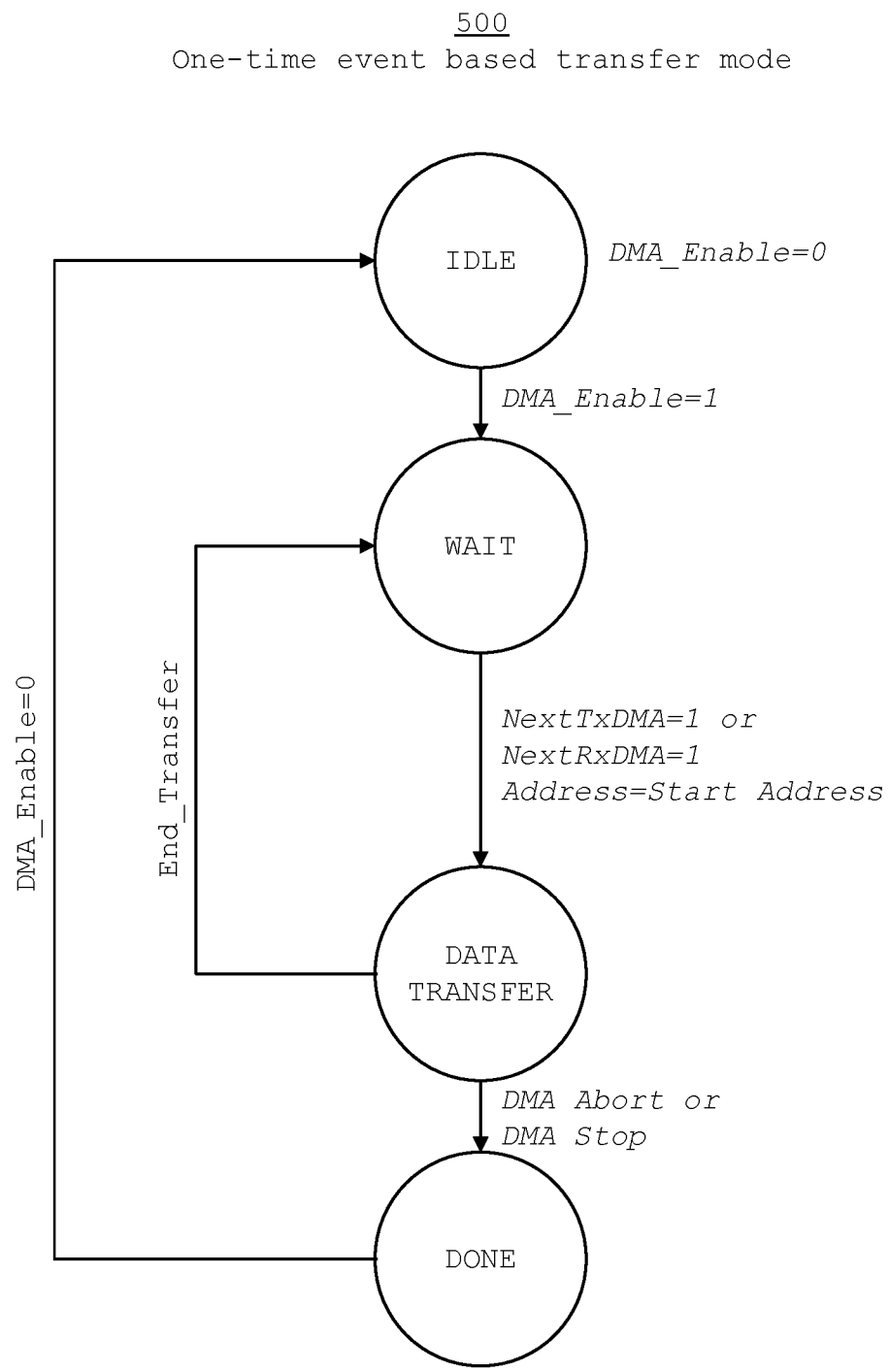
FIG. 6 shows a state diagram of a PDMA controller in a one-time event-based transfer mode, according to some embodiments of the present disclosure.

In a one-time event-based transfer mode, the PDMA controller 240 may operate as shown in the state machine diagram of FIG. 6. In an IDLE state, a DMA_Enable control line may be set to a logical 0. Setting DMA_Enable to a logical 1 may trigger the PDMA controller 240 to start a data transfer from the memory 230 to the Freq Spi Reg 110. When the data transfer finishes ('DMA STOP') or the DMA transfer aborts for whatever reason (DMA Abort), DMA_Enable may be set to logical 0 placing the PDMA controller 240 in IDLE mode again. When DMA transfer is enabled (DMA_Enable=1), Data may be transferred until a DMA Abort or DMA stop event is triggered. In the example of FIG. 6, the data transfer may occur when a nextTxDMA or a nextRxDMA trigger is received while in the WAIT state. The nextTxDMA may be used to trigger the PDMA controller 240 for a next Tx frequency to be set in the Freq Spi Reg 110. The nextRxDMA trigger may be used to trigger the PDMA controller 240 for a next Rx frequency to be set in the Freq Spi Reg 110.

Figure 7:
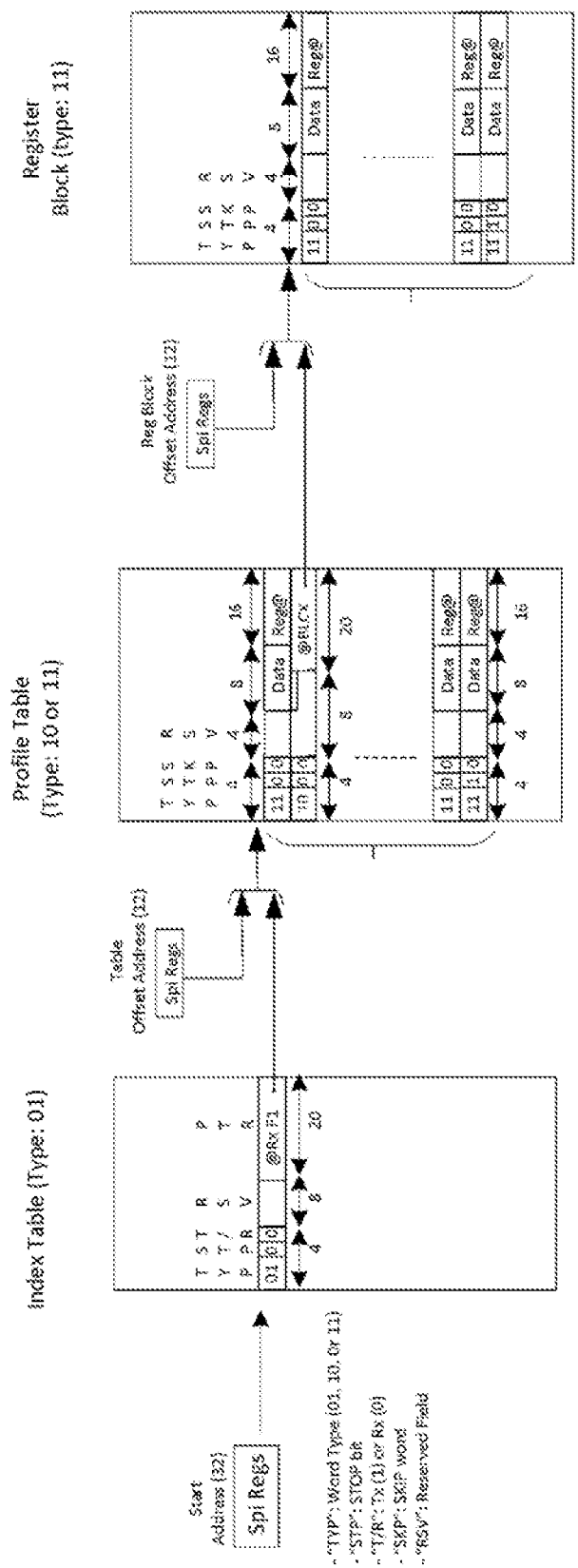
FIG. 7 shows another accessing of a frequency profile in a memory by a PDMA controller, according to some embodiments of the present disclosure.

FIG. 7 shows an example of loading of a frequency profile, e.g., the Rx F1 prof profile of FIG. 3, from a memory 230 by the PDMA controller 240 in a one-time event-based transfer mode. In the example of FIG. 7, the frequency profile is stored in the memory 230 as a series of data tables. An Spi register, e.g., address Spi register 242 of FIG. 2, may store a memory address, e.g., a 32-bit start address pointing to the memory location of an index table in the memory 230. When DMA_Enable is set, the PDMA controller 240 may start reading the index table from the memory 230.

The index table may include a pointer entry, including a pointer data field, e.g., the 20-bit PTR field shown in FIG. 7. The PTR field may be used to store a memory address (@Rx F1) of a profile table. As shown in FIG. 7, the pointer entry in the index table may include further information, such as type information (TYP), Tx/Rx information (T/R) and/or a reserved field for future or other use (RSV). A TYP field may be used to indicate a type of information of the entry, in this example using 2 bits '01' to indicate that the entry is a pointer entry. An STP bit may be used to indicate that there are more entries in the index table or that the entry is the last in the index table. A 1-bit T/R bit may be used to indicate that the pointer entry relates to a Rx or Tx frequency profile. In the example of FIG. 7, the pointer entry has a length of 32 bits, but any other length may be used as needed.

By reading the pointer address @Rx F1 of the PTR field from the index table, the PDMA controller 240 obtains a memory address in the memory 230 where the profile table is stored. The pointer address may be an indirect memory address that, together with a table offset address stored in a memory register, e.g., Spi registers (Spi Regs), forms the actual memory address of the profile table. In the example of FIG. 7, a 20-bit @Rx F1 address read from the PTR field in the index table is combined with a 12-bit table offset address from Spi Regs to form the memory address in the memory 230 where the profile table is stored.

The profile table may include entries similar to the entries of the register block shown in FIG. 5. Similar to the register block of FIG. 5, in the example of FIG. 7, entries in the profile table having a TYP=11 may be used by the PDMA controller 240 to obtain the Reg@ information pointing to the memory location of the Freq Spi Reg 110 where the data from the data field is to be stored. The PDMA controller 240 may use the data from the data field as frequency information to be written to the Freq Spi Reg 110.

In the example of FIG. 7, entries in the profile table having another TYP indicator, e.g., TYP=10, may be used to indicate that the entry includes a pointer to a register block. Such entry may include a pointer @BLCK to a memory address in the memory 230 where the register block is stored. The @BLCK pointer address may be an indirect memory address that, together with a reg block offset address stored in a memory register, e.g., Spi registers (Spi Regs), forms the actual memory address of the register block. In the example of FIG. 7, a 20-bit @BLCK address from an entry of the profile table is combined with a 12-bit reg block offset address from Spi Regs to form the memory address in the memory 230 where the register block is stored.

The register block may include entries similar to the entries of the register block shown in FIG. 5. Similar to the register block of FIG. 5, in the example of FIG. 7, entries in the profile table having a TYP=11 may be used by the PDMA controller 240 to obtain the Reg@ information pointing to the memory location of the Freq Spi Reg 110 where the data from the data field is to be stored. The PDMA controller 240 may use the data from the data field as frequency information to be written to the Freq Spi Reg 110.

In the example of FIG. 7, each entry in the index table, profile table and register block has a length of 32 bits, but any other length may be used as needed.

The entries in the index table, profile table and register block of FIG. 7 may be written to the memory 230 by the CPU 220, possibly under control of the BB processor 210. The one-time event-based transfer mode of operation may be useful for random index access. The CPU 220 may reconfigure the next address of the index for the next DMA transfer.

Example PDMA Controller Operating in a Continuous Event-Based Transfer Mode

Figure 8:
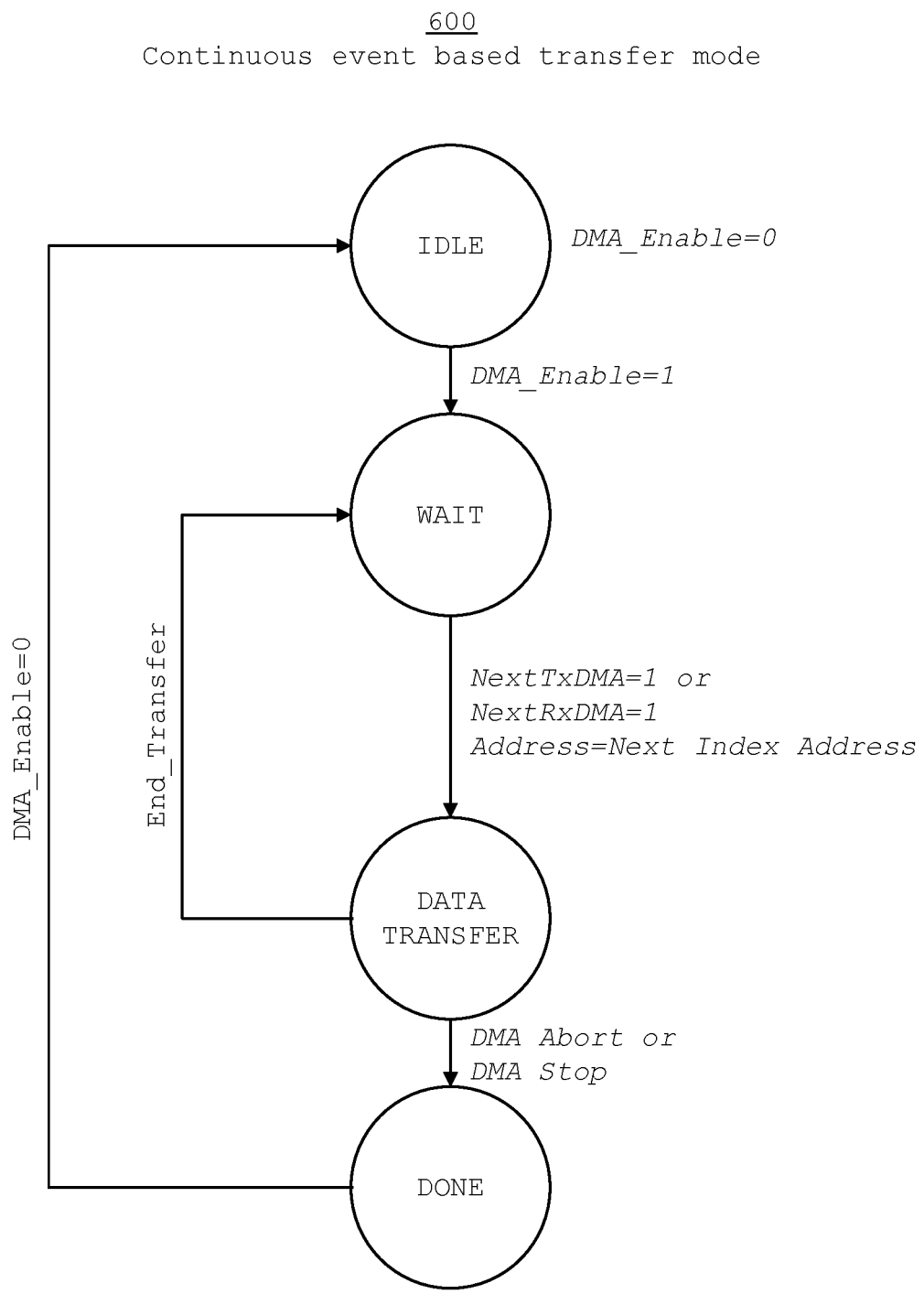
FIG. 8 shows a state diagram of a PDMA controller in a continuous event-based transfer mode, according to some embodiments of the present disclosure.
Figure 9:
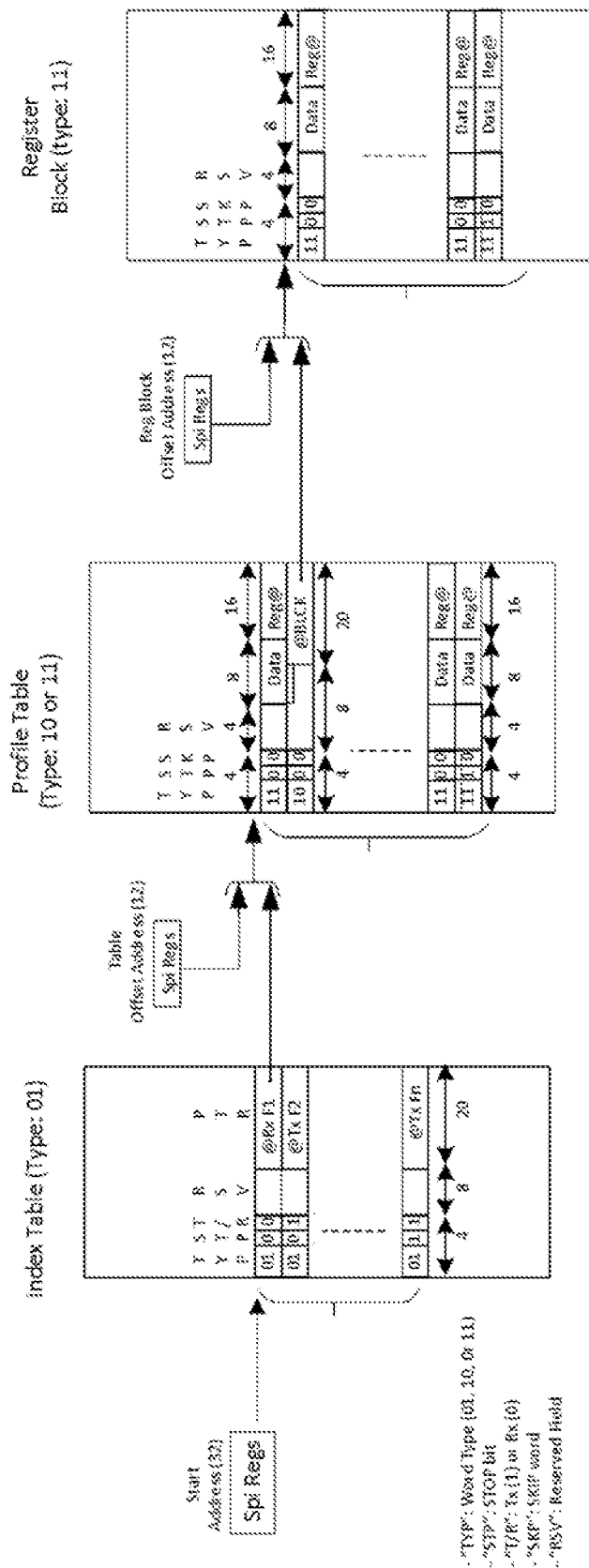
FIG. 9 shows another accessing of a frequency profile in a memory by a PDMA controller, according to some embodiments of the present disclosure.

In a continuous event-based transfer mode, the PDMA controller 240 may operate as shown in the state machine diagram of FIG. 8, which is similar to the state machine diagram of FIG. 6, except for the address used by the PDMA controller 240 for reading the index table between the WAIT state and the DATA TRANSFER state being a next index address in FIG. 8, as will be further explained with FIG. 9.

FIG. 9 shows an example of loading of a frequency profile similar to FIG. 7. The difference between FIG. 9 and FIG. 7 is in the index table of FIG. 9 including multiple entries, each pointing to another profile table. E.g., the first entry in the index table of FIG. 9 points to a profile table located at address @Rx F1 in the memory 230, i.e., a profile including hopping frequencies for a Rx path, such as Rx path 130 of FIG. 1. E.g., the second entry in the index table of FIG. 9 points to a profile table located at address @Tx F2 in the memory 230, i.e., a profile including hopping frequencies for a Tx path, such as Tx path 140 of FIG. 1. Where the state machine diagram of FIG. 8 indicates 'Address=Next Index Adress', this means that after each WAIT state, the next entry in the index table will be used instead of the first entry in the index table to which the start address points.

In the example of FIG. 9, each entry in the index table, profile table and register block has a length of 32 bits, but any other length may be used as needed.

The entries in the index table, profile table and register block of FIG. 7 may be written to the memory 230 by the CPU 220, possibly under control of the BB processor 210.

Example of Using PDMA for Fast Frequency Hopping

Figure 10:
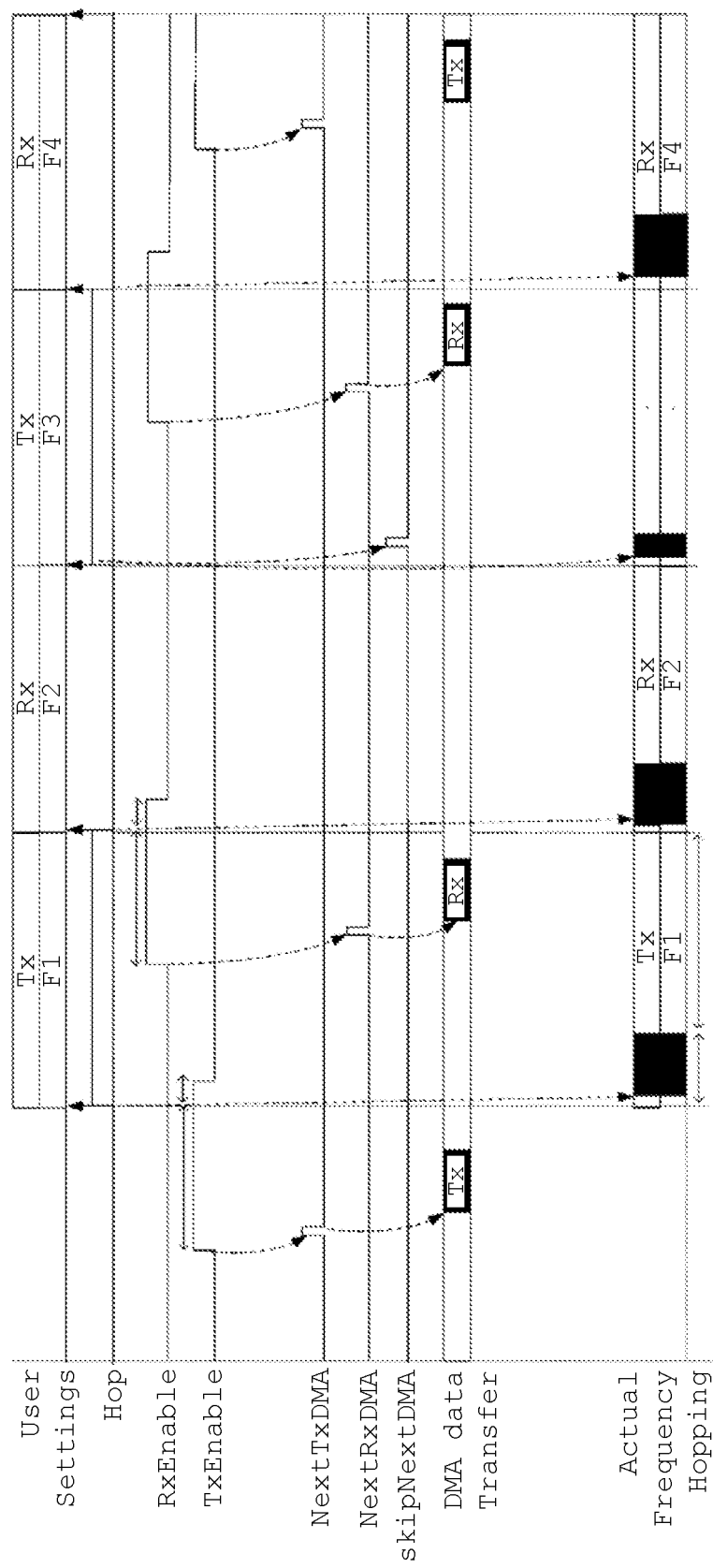
FIG. 10 shows a direct memory access (DMA) control, status and interrupts diagram, according to some embodiments of the present disclosure.

FIG. 10 shows a diagram illustrating how PDMA may be used during a fast frequency hopping mode of a transceiver, such as RF unit 100 of FIG. 1. Vertically, FIG. 10 shows signal lines (Hop, RxEnable, TxEnable, nextTxDMA, nextRxDMA, skipNextDMA) that can switch between a '0' state and a '1' state. Vertically, FIG. 10 furthermore shows data lines (User Settings, DMA data transfer, Actual Frequency Hopping) with data transfers. In FIG. 10, time progresses from left to right.

In the example of FIG. 10, PDMA is used to configure Tx and Rx profiles during fast frequency hopping. After each Tx or RX Enable event, CPU 220 may start a DMA transfer by asserting nextTxDMA or nextRxDMA inputs. A skip current DMA can be done by asserting skipNextDMA input. All these inputs may be controlled using Spi registers which are accessible using an Spi interface or CPU 220. The PDMA controller 240 reads the Spi registers, through which the PDMA controller 240 may thus be controlled.

The example of frequency hopping in FIG. 10 may use the continuous event-based data transfer, such as shown in FIG. 8, where hop events may be periodic.

Example Method for Configuring Hopping Frequencies of a Transceiver Device

Figure 11:
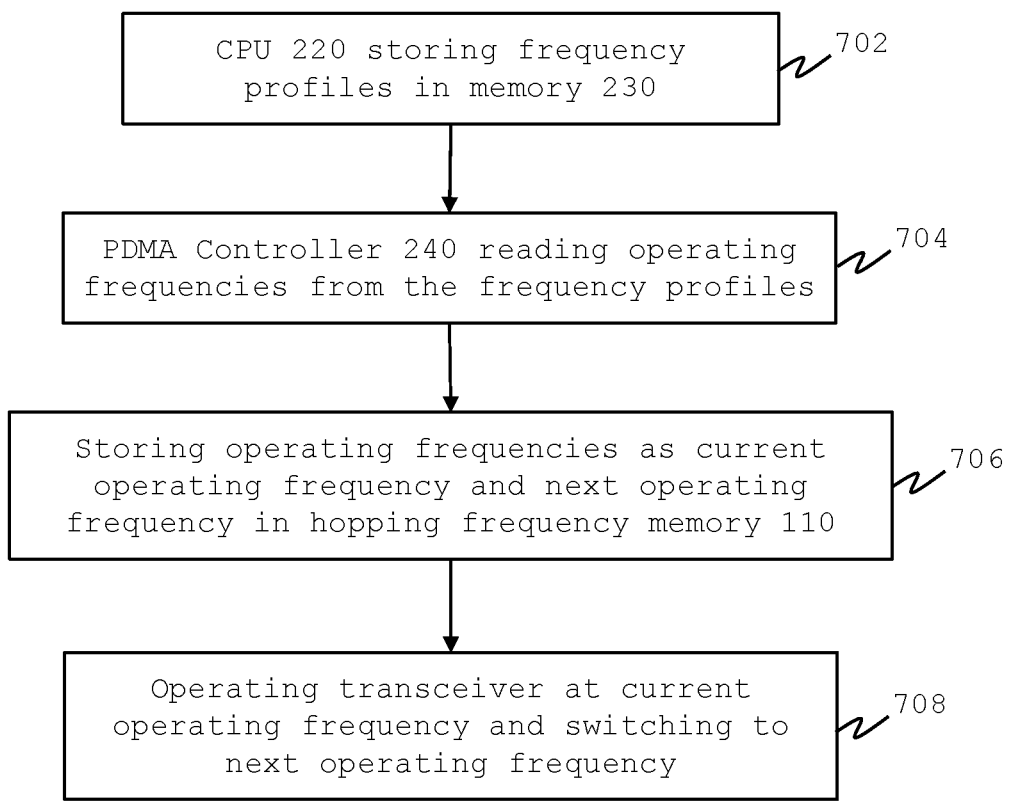
FIG. 11 shows a flow diagram of a method according to some embodiments of the present disclosure.

FIG. 11 shows a flow diagram of a method 700 for configuring the hopping frequencies of a transceiver device, e.g., RF unit 100, according to some embodiments of the present disclosure.

In step 702, a CPU of the transceiver device, e.g., CPU 220, may store one or more hopping frequency profiles in a memory of the transceiver device, e.g., memory 230. The one or more hopping frequency profiles may include operating frequencies of one or both of a transmitter part and a receiver part of the transceiver device, e.g., Rx path 130 and Tx path 140.

In step 704, a PDMA controller of the transceiver device, e.g., PDMA controller 240, may read the operating frequencies from the frequency profiles stored in the memory.

In step 706, the PDMA controller may store one of the operating frequencies as the current operating frequency and another one of the operating frequencies as the next operating frequency in a hopping frequency memory, e.g., Freq Spi Reg 110 or one or more of the registers for 112, 114, 116, 118.

The reading of the operating frequencies in step 704 and the storing in the hopping frequency memory in step 706 may be performed independently from the CPU.

In step 708, the transmitter part and/or receiver part of the transceiver device may be operated at the current operating frequency stored in the hopping frequency memory. The operating frequency may be switched to the next operating frequency stored in the hopping frequency memory.

Example Data Processing System

Figure 12:
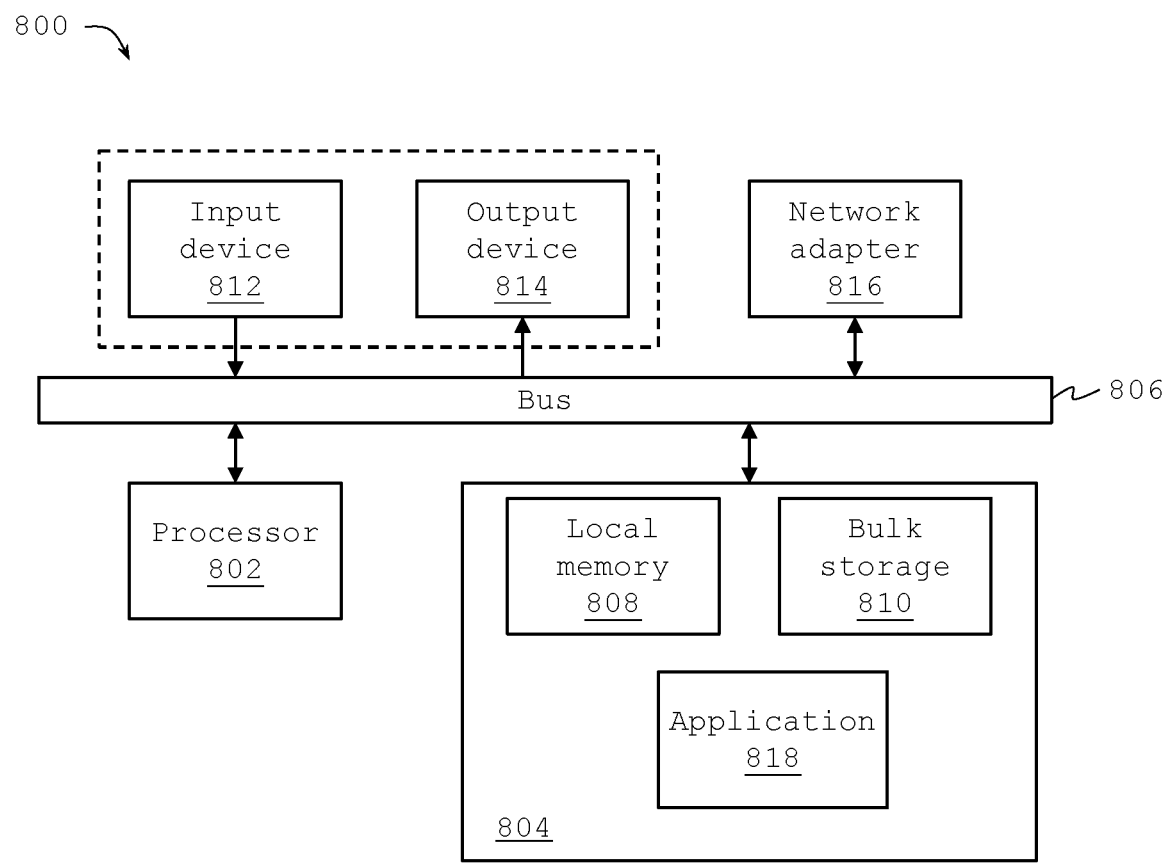
FIG. 12 provides a block diagram illustrating an example data processing system that may be configured to implement, or control, at least portions of operating a transceiver, according to some embodiments of the present disclosure.

FIG. 12 provides a block diagram illustrating an example data processing system 800 that may be configured to control operation of parts of a transceiver front end, as described herein, according to some embodiments of the present disclosure. For example, the data processing system 800 may be configured to implement or control portions of operating parts of the RF unit 100 as described with reference to FIG. 2.

As shown in FIG. 12, the data processing system 800 may include at least one processor 802, e.g., a hardware processor 802, coupled to memory elements 804 through a system bus 806. For example, CPU 220 may be implemented as a processor 802 and memory 230 may be implemented as one or more memory elements 804. As such, the data processing system may store program code within memory elements 804. Further, the processor 802 may execute the program code accessed from the memory elements 804 via a system bus 806. In one aspect, the data processing system may be implemented as a computer that is suitable for storing and/or executing program code. It should be appreciated, however, that the data processing system 800 may be implemented in the form of any system including a processor and a memory that is capable of performing the functions described within this disclosure.

In some embodiments, the processor 802 can execute software or an algorithm to perform the activities as discussed in the present disclosure, in particular activities related to configuring and/or operating PDMA controllers as described herein. The processor 802 may include any combination of hardware, software, or firmware providing programmable logic, including by way of non-limiting example a microprocessor, a digital signal processor (DSP), a field-programmable gate array (FPGA), a programmable logic array (PLA), an application specific integrated circuit (IC) (ASIC), or a virtual machine processor. The processor 802 may be communicatively coupled to the memory element 804, for example in a (DMA) configuration, so that the processor 802 may read from or write to the memory elements 804.

In general, the memory elements 804 may include any suitable volatile or non-volatile memory technology, including double data rate (DDR) RAM, synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 800 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Elements shown in the present figures can also include suitable interfaces for receiving, transmitting, and/or otherwise communicating data or information in a network environment so that they can communicate with, e.g., the data processing system 800.

In certain example implementations, mechanisms operating transceiver front ends as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as the memory elements 804 shown in FIG. 12, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as the processor 802 shown in FIG. 12, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 804 may include one or more physical memory devices such as, for example, local memory 808 and one or more bulk storage devices 810. The local memory may refer to RAM or other non-persistent memory device(s) generally used during actual execution of the program code. A bulk storage device may be implemented as a hard drive or other persistent data storage device. The data processing system 800 may also include one or more cache memories (not shown) that provide temporary storage of at least some program code in order to reduce the number of times program code must be retrieved from the bulk storage device 810 during execution.

As shown in FIG. 12, the memory elements 804 may store an application 818. In various embodiments, the application 818 may be stored in the local memory 808, the one or more bulk storage devices 810, or apart from the local memory and the bulk storage devices. It should be appreciated that the data processing system 800 may further execute an operating system (not shown in FIG. 8) that can facilitate execution of the application 818. The application 818, being implemented in the form of executable program code, can be executed by the data processing system 800, e.g., by the processor 802. Responsive to executing the application, the data processing system 800 may be configured to perform one or more operations or method steps described herein.

Input/output (I/O) devices depicted as an input device 812 and an output device 814, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 814 may be any type of screen display, such as plasma display, liquid crystal display (LCD), organic light emitting diode (OLED) display, electroluminescent (EL) display, or any other indicator, such as a dial, barometer, or LEDs. In some implementations, the system may include a driver (not shown) for the output device 814. Input and/or output devices 812, 814 may be coupled to the data processing system either directly or through intervening I/O controllers.

In an embodiment, the input and the output devices may be implemented as a combined input/output device (illustrated in FIG. 12 with a dashed line surrounding the input device 812 and the output device 814). An example of such a combined device is a touch sensitive display, also sometimes referred to as a "touch screen display" or simply "touch screen". In such an embodiment, input to the device may be provided by a movement of a physical object, such as a stylus or a finger of a user, on or near the touch screen display.

A network adapter 816 may also, optionally, be coupled to the data processing system to enable it to become coupled to other systems, computer systems, remote network devices, and/or remote storage devices through intervening private or public networks. The network adapter may include a data receiver for receiving data that is transmitted by said systems, devices and/or networks to the data processing system 800, and a data transmitter for transmitting data from the data processing system 800 to said systems, devices and/or networks. Modems, cable modems, and Ethernet cards are examples of different types of network adapter that may be used with the data processing system 800.

Select Examples

The following paragraphs provide various examples of the embodiments disclosed herein.

Example 1 provides a transceiver device. The transceiver may include a hopping frequency memory to store a current operating frequency and a next operating frequency of the transceiver device. The transceiver device may operate at the current operating frequency stored in the hopping frequency memory and switch to the next operating frequency stored in the hopping frequency memory. The transceiver device may include a memory to store one or more hopping frequency profiles including operating frequencies of one or both of a transmitter part and a receiver part of the transceiver device. The transceiver device may include a CPU to store or modify the one or more hopping frequency profiles in the memory. The transceiver device may include a PDMA controller to read the operating frequencies from the one or more hopping frequency profiles and store one of the operating frequencies as the current operating frequency and another one of the operating frequencies as the next operating frequency in the hopping frequency memory. The PDMA controller may operate independently from the CPU.

Example 2 provides a transceiver device according to example 1. The memory may store the one or more hopping frequency profiles in a register block. The register block may include the operating frequencies and a memory address of the hopping frequency memory for storing the operating frequencies. The PDMA controller may read the register block from a predefined start address in the memory. The PDMA controller may obtain an operating frequency from the register block. PDMA controller may obtain the memory address of the hopping frequency memory from the register block. PDMA controller may store the operating frequency obtained from the register block in the hopping frequency memory at the memory address obtained from the register block.

Example 3 provides a transceiver device according to example 1. The memory may store an index table. The index table may include a memory address of a profile table. The memory may further store the one or more hopping frequency profiles in the profile table. The profile table may include the operating frequencies and a memory address of the hopping frequency memory for storing the operating frequencies. The PDMA controller may read the index table from a predefined start address in the memory. The PDMA controller may obtain the memory address of the profile table from the index table. The PDMA controller may read the profile table from the memory address of the profile table obtained from the index table. The PDMA controller may obtain an operating frequency from the profile table. The PDMA controller may obtain the memory address of the hopping frequency memory from the profile table. The PDMA controller may store the operating frequency obtained from the profile table in the hopping frequency memory at the memory address of the hopping frequency memory obtained from the profile table.

Example 4 provides a transceiver device according to example 3. The profile table may include a memory address of a register block. The memory may store the one or more hopping frequency profiles in the register block. The register block may include the operating frequencies and the memory address of the hopping frequency memory for storing the operating frequencies. The PDMA controller may obtain the memory address of the register block from the profile table. The PDMA controller may read the register block from the memory address of the register block in the memory. The PDMA controller may obtain an operating frequency from the register block. The PDMA controller may obtain the memory address of the hopping frequency memory from the register block. The PDMA controller may store the operating frequency obtained from the register block in the hopping frequency memory at the memory address of the hopping frequency memory obtained from the register block.

Example 5 provides a transceiver device according to example 1. The PDMA controller may be configurable to operate in one of a block transfer mode, a one-time event-based transfer mode or a continuous event-based transfer mode.

Example 6 provides a transceiver device according to example 1. The transceiver device may further include a RF unit. The hopping frequency memory may be a part of the RF unit.

Example 7 provides a transceiver device according to example 6. The RF unit may include the transmitter part and the receiver part. The PDMA controller may store the current operating frequency and the next operating frequency for each of the transmitter part and the receiver part.

Example 8 provides a transceiver device according to example 6. The RF unit may operate in a fast frequency hopping mode.

Example 9 provides a transceiver device according to example 1. The PDMA controller may save the current operating frequency and the next operating frequency from the hopping frequency memory and restore the current operating frequency and the next operating frequency in the hopping frequency memory.

Example 10 provides a transceiver device according to example 9. The transceiver device may enter a deep sleep state and wake up periodically. The PDMA controller may save the current operating frequency and the next operating frequency from the hopping frequency memory when entering the deep sleep state and restore the current operating frequency and the next operating frequency in the hopping frequency memory after wake up.

Example 11 provides a transceiver device according to example 1. The hopping frequency memory may be implemented as one or more internal configuration registers.

Example 12 provides a PDMA controller. The PDMA controller may be communicatively coupled to a memory to store one or more hopping frequency profiles. The one or more hopping frequencies may include operating frequencies of one or both of a transmitter part and a receiver part of a transceiver device. The PDMA controller may further be communicatively coupled to a hopping frequency memory to store a current operating frequency and a next operating frequency of the transceiver device. The PDMA controller may read the operating frequencies from the one or more hopping frequency profiles in the memory and store one of the operating frequencies as the current operating frequency and another one of the operating frequencies as the next operating frequency in the hopping frequency memory.

Example 13 provides a PDMA controller according to example 12. The PDMA controller may read the operating frequencies from the one or more hopping frequency profiles in the memory independently from a CPU of the transceiver device to store or modify the one or more hopping frequency profiles in the memory.

Example 14 provides a PDMA controller according to example 12. The PDMA controller may be communicatively connected to a memory register for the PDMA controller. The memory register for the PDMA controller may include a memory address of the one of more hopping frequency profiles in the memory.

Example 15 provides a PDMA controller according to example 14. The memory address of the one or more hopping frequency profiles in the memory register for the PDMA controller may be a relative memory address, which together with an offset address forms a physical memory address of the one or more hopping frequency profiles in the memory.

Example 16 provides a PDMA controller according to example 12. The one or more frequency profiles may include a series of data entries. One or more data entries may include an operating frequency of one of the current operating frequency and the next operating frequency.

Example 17 provides a PDMA controller according to example 16. The one or more data entries may include a memory address of the hopping frequency memory where the operating frequency is to be stored as one of the current operating frequency and the next operating frequency.

Example 18 provides a method for configuring hopping frequencies of a transceiver device. The method may include storing one or more hopping frequency profiles in a memory under control of a CPU. The one or more hopping frequency profiles may include operating frequencies of one or both of a transmitter part and a receiver part of the transceiver device. The method may include reading the operating frequencies from the one or more hopping frequency profiles. The method may include storing one of the operating frequencies as a current operating frequency and another one of the operating frequencies as a next operating frequency in a hopping frequency memory of the transceiver device. The reading of the operating frequencies and the storing in the hopping frequency memory may be performed independently from the CPU.

Example 19 provides a method according to example 18. The method may include operating the transceiver device at the current operating frequency stored in the hopping frequency memory. The method may include switching to the next operating frequency stored in the hopping frequency memory.

Example 20 provides a method according to example 18. The reading of the operating frequencies and the storing in the hopping frequency memory may be performed by a PDMA controller.

Other Implementation Notes, Variations, and Applications

PDMA may be used to save and restore data during a monitor operation mode where the system enters deep sleep and wakes up periodically. A PDMA register save may be performed before entering sleep state, and a register restore may be performed by the PDMA controller 240 right after wake up.

PDMA may be based on a specific linked-list data structure to support dynamic register configurations. Three types of memory words have been discussed in conjunction with FIG. 5, FIG. 7 and FIG. 9:

Index table: may include a table of profiles. Each entry may include a pointer to a profile table;

Profile Table: may include a list of write transfers using single word or a pointer to block transfers;

Register Block: may include only register write transfers. Each write transfer may be described by the destination address and the data to be transferred.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It is also imperative to note that all of the specifications, dimensions, and relationships outlined herein (e.g., the number of modules/systems, logic operations, etc.) have only been offered for purposes of example and teaching only. Such information may be varied considerably without departing from the spirit of the present disclosure, or the scope of the appended claims. The specifications apply only to some non-limiting examples and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the drawings may be combined in various possible configurations, all of which are clearly within the broad scope of the present disclosure.

Note that in the present description, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

The invention claimed is:

1. A transceiver device comprising:
    a hopping frequency memory to store a current operating frequency and a next operating frequency of the transceiver device, wherein the transceiver device is to operate at the current operating frequency stored in the hopping frequency memory and switch to the next operating frequency stored in the hopping frequency memory;
    a memory to store one or more hopping frequency profiles comprising operating frequencies of one or both of a transmitter part and a receiver part of the transceiver device;
    a central processing unit to store or modify the one or more hopping frequency profiles in the memory; and
    a profile-based direct memory access (PDMA) controller to read the operating frequencies from the one or more hopping frequency profiles and store one of the operating frequencies as the current operating frequency and another one of the operating frequencies as the next operating frequency in the hopping frequency memory, wherein the PDMA controller is to operate independently from the central processing unit.

2. The transceiver device according to claim 1,
    wherein the memory is to store the one or more hopping frequency profiles in a register block, the register block comprising the operating frequencies and a memory address of the hopping frequency memory for storing the operating frequencies,
    wherein the PDMA controller is to:
        read the register block from a predefined start address in the memory;
        obtain an operating frequency from the register block;
        obtain the memory address of the hopping frequency memory from the register block; and
        store the operating frequency obtained from the register block in the hopping frequency memory at the memory address obtained from the register block.

3. The transceiver device according to claim 1,
    wherein the memory is to store an index table, the index table comprising a memory address of a profile table,
    wherein the memory is to further store the one or more hopping frequency profiles in the profile table, the profile table comprising the operating frequencies and a memory address of the hopping frequency memory for storing the operating frequencies,
    wherein the PDMA controller is to:
        read the index table from a predefined start address in the memory;
        obtain the memory address of the profile table from the index table;
        read the profile table from the memory address of the profile table obtained from the index table;
        obtain an operating frequency from the profile table;
        obtain the memory address of the hopping frequency memory from the profile table; and
        store the operating frequency obtained from the profile table in the hopping frequency memory at the memory address of the hopping frequency memory obtained from the profile table.

4. The transceiver device according to claim 3,
    wherein the profile table comprises a memory address of a register block,
    wherein the memory is to store the one or more hopping frequency profiles in the register block, the register block comprising the operating frequencies and the memory address of the hopping frequency memory for storing the operating frequencies,
    wherein the PDMA controller is to:
        obtain the memory address of the register block from the profile table;
        read the register block from the memory address of the register block in the memory;
        obtain an operating frequency from the register block;
        obtain the memory address of the hopping frequency memory from the register block; and
        store the operating frequency obtained from the register block in the hopping frequency memory at the memory address of the hopping frequency memory obtained from the register block.

5. The transceiver device according to claim 1, wherein the PDMA controller is configurable to operate in one of a block transfer mode, a one-time event-based transfer mode or a continuous event-based transfer mode.

6. The transceiver device according to claim 1, further comprising a radio frequency unit, and wherein the hopping frequency memory is a part of the radio frequency unit.

7. The transceiver device according to claim 6, wherein the radio frequency unit comprises the transmitter part and the receiver part, and wherein the PDMA controller is to store the current operating frequency and the next operating frequency for each of the transmitter part and the receiver part.

8. The transceiver device according to claim 6, wherein the radio frequency unit is to operate in a fast frequency hopping mode.

9. The transceiver device according to claim 1, wherein the PDMA controller is to save the current operating frequency and the next operating frequency from the hopping frequency memory and restore the current operating frequency and the next operating frequency in the hopping frequency memory.

10. The transceiver device according to claim 9, where the transceiver device is to enter a deep sleep state and wake up periodically, and wherein the PDMA controller is to save the current operating frequency and the next operating frequency from the hopping frequency memory when entering the deep sleep state and restore the current operating frequency and the next operating frequency in the hopping frequency memory after wake up.

11. The transceiver device according to claim 1, wherein the hopping frequency memory is implemented as one or more internal configuration registers.

12. A profile-based direct memory access (PDMA) controller,
wherein the PDMA controller is communicatively coupled to a memory to store one or more hopping frequency profiles, the one or more hopping frequency profiles comprising operating frequencies of one or both of a transmitter part and a receiver part of a transceiver device;
wherein the PDMA controller is further communicatively coupled to a hopping frequency memory to store a current operating frequency and a next operating frequency of the transceiver device;
wherein the PDMA controller is to read the operating frequencies from the one or more hopping frequency profiles in the memory and store one of the operating frequencies as the current operating frequency and another one of the operating frequencies as the next operating frequency in the hopping frequency memory.

13. The PDMA controller according to claim 12, wherein the PDMA controller is to read the operating frequencies from the one or more hopping frequency profiles in the memory independently from a central processing unit of the transceiver device to store or modify the one or more hopping frequency profiles in the memory.

14. The PDMA controller according to claim 12, wherein the PDMA controller is communicatively connected to a memory register for the PDMA controller, the memory register for the PDMA controller comprising a memory address of the one or more hopping frequency profiles in the memory.

15. The PDMA controller according to claim 14, wherein the memory address of the one or more hopping frequency profiles in the memory register for the PDMA controller is a relative memory address, which together with an offset address forms a physical memory address of the one or more hopping frequency profiles in the memory.

16. The PDMA controller according to claim 12, wherein the one or more hopping frequency profiles comprises a series of data entries, wherein one or more data entries comprises an operating frequency of one of the current operating frequency and the next operating frequency.

17. The PDMA controller according to claim 16, wherein the one or more data entries comprises a memory address of the hopping frequency memory where the operating frequency is to be stored as one of the current operating frequency and the next operating frequency.

18. A method for configuring hopping frequencies of a transceiver device, comprising:
storing one or more hopping frequency profiles in a memory under control of a central processing unit, the one or more hopping frequency profiles comprising operating frequencies of one or both of a transmitter part and a receiver part of the transceiver device;
reading the operating frequencies from the one or more hopping frequency profiles; and
storing one of the operating frequencies as a current operating frequency and another one of the operating frequencies as a next operating frequency in a hopping frequency memory of the transceiver device,
wherein the reading of the operating frequencies and the storing in the hopping frequency memory are performed independently from the central processing unit.

19. The method according to claim 18, further comprising:
operating the transceiver device at the current operating frequency stored in the hopping frequency memory;
and switching to the next operating frequency stored in the hopping frequency memory.

20. The method according to claim 18, wherein the reading of the operating frequencies and the storing in the hopping frequency memory are performed by a profile-based direct memory access controller.

* * * * *